US012602524B2

(12) United States Patent
Deng

(10) Patent No.: US 12,602,524 B2
(45) Date of Patent: Apr. 14, 2026

(54) METHOD OF CALCULATING INTENSITY OF LIGHT LEAKAGE

(71) Applicant: TCL China Star Optoelectronics Technology Co., Ltd., Shenzhen (CN)

(72) Inventor: Chuanghua Deng, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 1220 days.

(21) Appl. No.: 17/603,064

(22) PCT Filed: Aug. 11, 2021

(86) PCT No.: PCT/CN2021/112052
§ 371 (c)(1),
(2) Date: Feb. 2, 2023

(87) PCT Pub. No.: WO2023/004887
PCT Pub. Date: Feb. 2, 2023

(65) Prior Publication Data
US 2024/0061976 A1 Feb. 22, 2024

(30) Foreign Application Priority Data
Jul. 26, 2021 (CN) .......................... 202110844585.5

(51) Int. Cl.
*G06F 30/23* (2020.01)
*G02F 1/13* (2006.01)
*G06F 111/10* (2020.01)

(52) U.S. Cl.
CPC ............ *G06F 30/23* (2020.01); *G02F 1/1309* (2013.01); *G06F 2111/10* (2020.01)

(58) Field of Classification Search
CPC .. G06F 30/23; G06F 2111/10; G06F 2119/14; G02F 1/1309
See application file for complete search history.

(56) References Cited

U.S. PATENT DOCUMENTS

| | | | | |
|---|---|---|---|---|
| 2013/0038740 A1* | 2/2013 | Ding | .................... | G09G 3/006 |
| | | | | 348/189 |
| 2016/0357038 A1* | 12/2016 | Zhao | ................ | G02F 1/134363 |

FOREIGN PATENT DOCUMENTS

| | | |
|---|---|---|
| CN | 103245437 | 8/2013 |
| CN | 109946001 | 6/2019 |
| CN | 110333221 | 10/2019 |
| CN | 113158518 | 7/2021 |

OTHER PUBLICATIONS

International Search Report and the Written Opinion Dated Apr. 26, 2022 From the International Searching Authority Re. Application No. PCT/CN2021/112052 and Its Translation Into English. (13 Pages).

* cited by examiner

*Primary Examiner* — Thomas M Hammond, III

(57) ABSTRACT

The present invention provides a method of calculating an intensity of light leakage by extracting geometric design parameters of a curved display device and establishing a finite element model according to the geometric design parameters. The finite element model is subjected to bending deformation, and according to an obtained stress and a conversion relationship, a complex amplitude matrix and the intensity of light leakage of the curved display device are obtained. As such, the intensity of light leakage calculated in the present invention is more accurate, and a better reference can be provided for a design of the curved display device.

20 Claims, 5 Drawing Sheets providing a display panel, and measuring parameter values of the display panel; — S100 determining a global XY coordinate system, and establishing a finite element model on the global XY coordinate system according to the measured parameter values; — S101 dividing the finite element model into at least two sub-layers, applying a bending deformation force to the finite element model, and extracting a stress component value generated on a surface of one of the sub-layers corresponding to a side of the finite element model when the finite element model is deformed — S102 calculating a principal stress and a direction angle of the principal stress corresponding to the one of the sub-layers according to the stress component value on the surface of the one of the sub-layers; — S103 obtaining a phase difference generated by an incident light on each of the sub-layers according to the principal stress of the one of the sub-layers, and obtaining a complex amplitude matrix of a transmitted light corresponding to the incident light according to the phase difference; — S104 repeating the above steps, and respectively measuring the complex amplitude matrix of the transmitted light when the incident light passes through each of the sub-layers, and obtaining an intensity of light leakage of the curved display device according to the complex amplitude matrix. — S105

FIG. 2

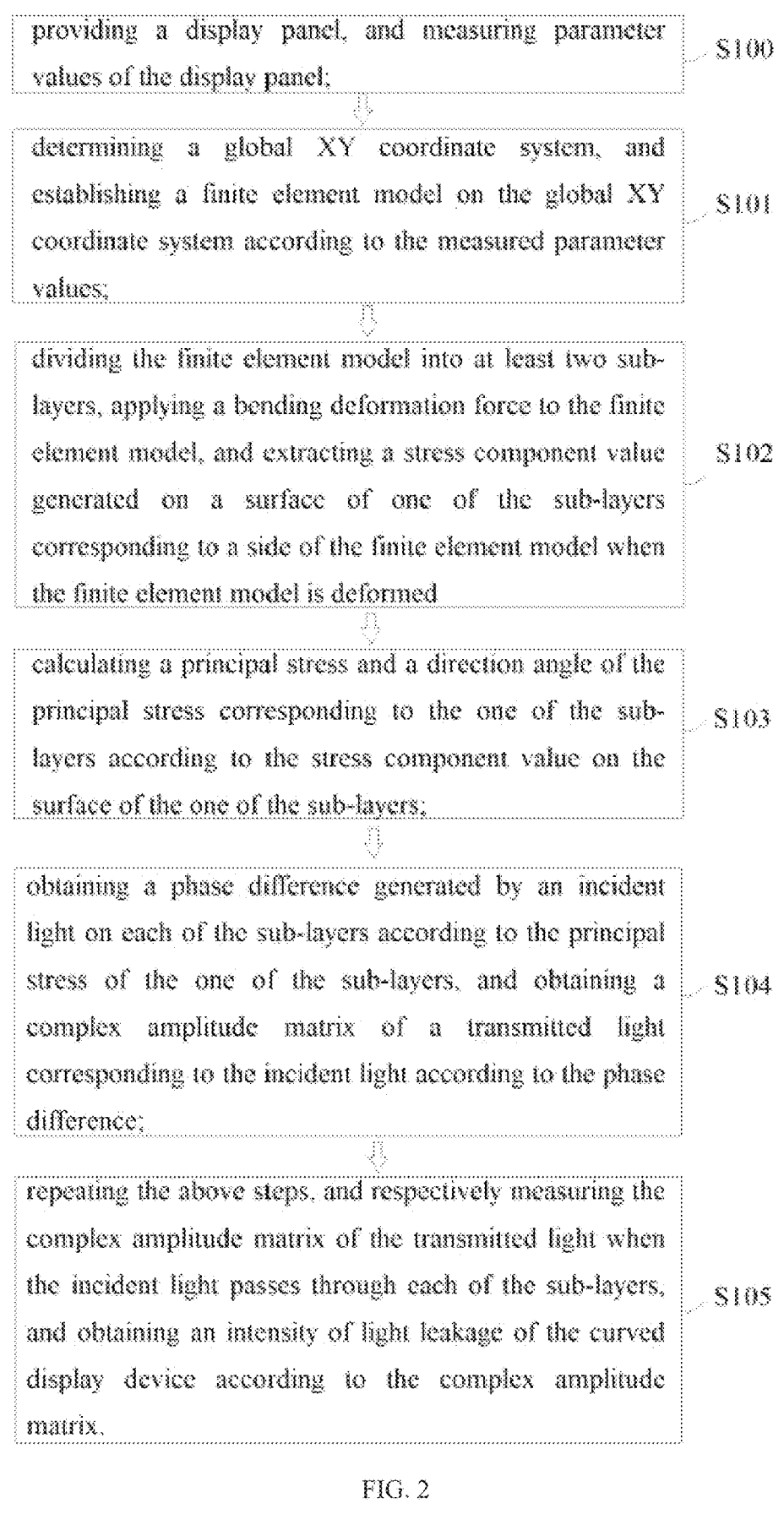

METHOD OF CALCULATING INTENSITY OF LIGHT LEAKAGE

RELATED APPLICATIONS

This application is a National Phase of PCT Patent Application No. PCT/CN2021/112052 having International filing date of Aug. 11, 2021, which claims the benefit of priority of Chinese Patent Application No. 202110844585.5 filed on Jul. 26, 2021. The contents of the above applications are all incorporated by reference as if fully set forth herein in their entirety.

FIELD AND BACKGROUND OF THE INVENTION

The present invention relates to a technical field of touch signals, in particular to a calculation method and a calibration device of an intensity of light leakage.

With continuous improvement of display technology, people have put forward higher requirements on performance of display panels and display devices, and display quality of panels.

Compared with flat-panel display products, curved-screen displays continue to be favored by people because of their larger viewing angles and display effects. In a curved display panel, a display screen has a certain bending curvature, which causes glass and layers to withstand a shaping stress. Moreover, the larger a curvature is, the smaller a bending radius is, and the greater a stress corresponding to the layers is. When the layers or glass bears an excessive stress, a photoelastic effect will occur, which in turn causes a problem of light leakage when the screen is in a dark state, and impacts the display effects of the curved display panel. In order to prevent a serious light leakage problem after a curved display device is assembled, it is necessary to evaluate design parameters of a curved screen at beginning of design and calculate an intensity of light leakage corresponding to the curved screen, so as to compensate the curved screen according to the intensity of light leakage. However, in the prior art, the intensity of light leakage of the curved display device cannot be accurately calculated and obtained, so that the curved display device cannot be better compensated, and a design basis cannot be provided.

In summary, when designing and manufacturing the display device, the intensity of light leakage of the display device in the dark state cannot be calculated accurately, and the curved display device cannot be compensated well, thereby increasing manufacturing cost of the curved display device.

SUMMARY OF THE INVENTION

In order to solve the above problem, an embodiment of the present invention provides a method of calculating an intensity of light leakage to accurately calculate the intensity of light leakage of a display device in a dark state, and according to the intensity of light leakage, a structure of a curved display device is compensated during design, thereby improving performance of a panel.

In order to solve the above technical problem, technical methods provided by the embodiments of the present invention are as follows:

In a first aspect of an embodiment of the present invention, a method of calculating the intensity of light leakage is provided, which includes the following steps:

providing a display panel, and measuring parameter values of the display panel;

determining a global XY coordinate system, and establishing a finite element model on the global XY coordinate system according to the measured parameter values;

dividing the finite element model into at least two sub-layers, applying a bending deformation force to the finite element model, and extracting a stress component value generated on a surface of one of the sub-layers corresponding to a side of the finite element model when the finite element model is deformed, wherein when the bending deformation force is applied to the finite element model, a magnitude of the bending deformation force is a standard atmospheric pressure, and the bending deformation force is applied to an upper surface and a lower surface of the finite element model;

calculating a principal stress and a direction angle of the principal stress corresponding to the one of the sub-layers according to the stress component value on the surface of the one of the sub-layers;

obtaining a phase difference generated by an incident light on each of the sub-layers according to the principal stress of the one of the sub-layers, and obtaining a complex amplitude matrix of a transmitted light corresponding to the incident light according to the phase difference; and repeating the above steps, and respectively measuring the complex amplitude matrix of the transmitted light when the incident light passes through each of the sub-layers, and obtaining an intensity of light leakage of the curved display device according to the complex amplitude matrix.

According to an embodiment of the present invention, when calculating the stress component value, a normal stress component and a shear stress component of the incident light corresponding to the upper surface of each of the sub-layers: $\sigma_{(top)x}$, $\sigma_{(top)y}$, $\tau_{(top)xy}$, and a normal stress component and a shear stress component of the incident light corresponding to the lower surface: $\sigma_{(bot)x}$, $\sigma_{(bot)y}$, $\tau_{(bot)xy}$ are first calculated; where "top" represents the upper surface of each of the sub-layers, and "bot" represents the lower surface of each of the sub-layers.

According to an embodiment of the present invention, when calculating the stress component value, the sub-layers are divided into m layers in a thickness direction, and a stress component value corresponding to an i-th layer of the m layers is obtained according to linear interpolation; wherein m and i are integers, and m≥2.

According to an embodiment of the present invention, the stress component value corresponding to the i-th layer is as follows:

$$\begin{cases} \sigma_{(i)x} = \dfrac{i-1}{m}(\sigma_{(top)x} - \sigma_{(bot)x}) + \sigma_{(bot)x} \\ \sigma_{(i)y} = \dfrac{i-1}{m}(\sigma_{(top)y} - \sigma_{(bot)y}) + \sigma_{(bot)y} \\ \tau_{(i)xy} = \dfrac{i-1}{m}(\tau_{(top)xy} - \tau_{(bot)xy}) + \tau_{(bot)xy} \end{cases}$$

wherein 1≤i≤m.

According to an embodiment of the present invention, when calculating a magnitude of the principal stress and the direction angle of the principal stress, the following Formula is used:

$$\left.\begin{array}{r} \sigma_{(i)1} \\ \sigma_{(i)2} \end{array}\right\} = \frac{\sigma_{(i)x} + \sigma_{(i)y}}{2} \pm \sqrt{\left(\frac{\sigma_{(i)x} - \sigma_{(i)y}}{2}\right)^2 + \tau_{(i)xy}^2}$$

$$\theta_i = \arctan\left(\frac{\tau_{(i)xy}}{\sigma_{(i)1} - \sigma_{(i)y}}\right)$$

wherein $\sigma_{(i)1}$ and $\sigma_{(i)2}$ respectively represent a maximum principal stress and a minimum principal stress of a corresponding one of sub-layers in the global xy coordinate plane, and $\theta i$ represents the direction angle of the principal stress.

According to an embodiment of the present invention, the phase difference is calculated according to the following relationship formula:

$$\delta_i = \frac{2\pi}{\lambda}[Ch_i(\sigma_{(i)1} - \sigma_{(i)2})],$$

wherein C represents a relative stress optical coefficient of each of the sub-layers, $\lambda$ represents a wavelength of a light wave, and hi represents a thickness of each of the sub-layers.

According to an embodiment of the present invention, when the incident light is into the i-th layer, the complex amplitude matrix corresponding to the incident light in the global coordinate system is calculated, and the complex amplitude matrix is expressed as:

$$\begin{bmatrix} \tilde{E}_{in,x} \\ \tilde{E}_{in,y} \end{bmatrix} = \begin{bmatrix} A_{in,x}e^{-i\varphi_{in,x}} \\ A_{in,y}e^{-i\varphi_{in,y}} \end{bmatrix},$$

wherein A represents an amplitude of the light wave, $\varphi$ represents a phase, and in represents the incident light.

According to an embodiment of the present invention, the method of calculating the intensity of light leakage further includes the following steps:

S100: rotating the complex amplitude matrix by an angle of $\theta i$ to correspondingly obtain a local x'y' coordinate system, and obtaining the complex amplitude matrix corresponding to the incident light in the local x'y' coordinate system as follows:

$$\begin{bmatrix} \tilde{E}_{out,x'} \\ \tilde{E}_{out,y'} \end{bmatrix} = \begin{bmatrix} \tilde{E}_{in,x'}e^{-i\delta_i} \\ \tilde{E}_{in,y'} \end{bmatrix},$$

wherein x' and y' are coordinate values corresponding to the local x'y' coordinate system, and "out" represents the transmitted light; and S101: further rotating the complex amplitude matrix obtained in the local x'y' coordinate system by an angle of $-\theta i$ after conversion is completed, and obtaining the complex amplitude matrix of the transmitted light corresponding to the incident light in the global XY coordinate system as follows:

$$\begin{bmatrix} \tilde{E}_{out,x} \\ \tilde{E}_{out,y} \end{bmatrix} = G_i \cdot \begin{bmatrix} \tilde{E}_{in,x} \\ \tilde{E}_{in,y} \end{bmatrix},$$

wherein $$G_i = T_i^{-1} \cdot \begin{bmatrix} e^{-i\delta_i} & 0 \\ 0 & 1 \end{bmatrix} \cdot T_i.$$

According to an embodiment of the present invention, the step S101 further includes the following steps:

multiplying complex amplitude corresponding to the incident light in the sub-layers when the transmitted light passes through an m-th layer of sub-layers;

wherein $$\begin{bmatrix} \tilde{E}_{out,x} \\ \tilde{E}_{out,y} \end{bmatrix} = G_m \cdot \ldots \cdot G_2 \cdot G_1 \cdot \begin{bmatrix} \tilde{E}_{in,x} \\ \tilde{E}_{in,y} \end{bmatrix}.$$

According to an embodiment of the present invention, the intensity of light leakage is equal to a square of a modulus of the complex amplitude matrix corresponding to a component on a y-axis of the complex amplitude matrix corresponding to the transmitted light.

In a second aspect of an embodiment of the present invention, a method of calculating an intensity of light leakage is provided, which includes the following steps:

providing a display panel, and measuring parameter values of the display panel;

determining a global XY coordinate system, and establishing a finite element model on the global XY coordinate system according to the measured parameter values;

dividing the finite element model into at least two sub-layers, applying a bending deformation force to the finite element model, and extracting a stress component value generated on a surface of one of the sub-layers corresponding to a side of the finite element model when the finite element model is deformed;

calculating a principal stress and a direction angle of the principal stress corresponding to the one of the sub-layers according to the stress component value on the surface of the one of the sub-layers;

obtaining a phase difference generated by an incident light on each of the sub-layers according to the principal stress of the one of the sub-layers, and obtaining a complex amplitude matrix of a transmitted light corresponding to the incident light according to the phase difference; and repeating the above steps, and respectively measuring the complex amplitude matrix of the transmitted light when the incident light passes through each of the sub-layers, and obtaining an intensity of light leakage of the curved display device according to the complex amplitude matrix.

According to an embodiment of the present invention, when calculating the stress component value, a normal stress component and a shear stress component of the incident light corresponding to the upper surface of each of the sub-layers: $\sigma_{(top)x}$, $\sigma_{(top)y}$, $\tau_{(top)xy}$, and a normal stress component and a shear stress component of the incident light corresponding to the lower surface: $\sigma_{(bot)x}$, $\sigma_{(bot)y}$, $\tau_{(bot)xy}$ are first calculated; where "top" represents the upper surface of each of the sub-layers, and "bot" represents the lower surface of each of the sub-layers.

According to an embodiment of the present invention, when calculating the stress component value, the sub-layers are divided into m layers in a thickness direction, and a stress component value corresponding to an i-th layer of the m layers is obtained according to linear interpolation; wherein m and i are integers, and m≥2.

According to an embodiment of the present invention, when calculating the stress component value, the sub-layers are divided into m layers in a thickness direction, and a stress component value corresponding to an i-th layer of the m layers is obtained according to linear interpolation; wherein m and i are integers, and m≥2.

According to an embodiment of the present invention, the stress component value corresponding to the i-th layer is as follows:

$$
\begin{cases}
\sigma_{(i)x} = \dfrac{i-1}{m}(\sigma_{(top)x} - \sigma_{(bot)x}) + \sigma_{(bot)x} \\
\sigma_{(i)y} = \dfrac{i-1}{m}(\sigma_{(top)y} - \sigma_{(bot)y}) + \sigma_{(bot)y} \ , \\
\tau_{(i)xy} = \dfrac{i-1}{m}(\tau_{(top)xy} - \tau_{(bot)xy}) + \tau_{(bot)xy}
\end{cases}
$$

wherein $1 \le i \le m$.

According to an embodiment of the present invention, when calculating a magnitude of the principal stress and the direction angle of the principal stress, the following Formula is used:

$$
\left.\begin{array}{r}\sigma_{(i)1} \\ \sigma_{(i)2}\end{array}\right\} = \frac{\sigma_{(i)x} + \sigma_{(i)y}}{2} \pm \sqrt{\left(\frac{\sigma_{(i)x} - \sigma_{(i)y}}{2}\right)^2 + \tau_{(i)xy}^2}
$$

$$
\theta_i = \arctan\left(\frac{\tau_{(i)xy}}{\sigma_{(i)1} - \sigma_{(i)y}}\right)
$$

wherein $\sigma_{(i)1}$ and $\sigma_{(i)2}$ respectively represent a maximum principal stress and a minimum principal stress of a corresponding one of sub-layers in the global xy coordinate plane, and $\theta i$ represents the direction angle of the principal stress.

According to an embodiment of the present invention, the phase difference is calculated according to the following relationship formula:

$$
\delta_i = \frac{2\pi}{\lambda}[Ch_i(\sigma_{(i)1} - \sigma_{(i)2})],
$$

wherein C represents a relative stress optical coefficient of each of the sub-layers, $\lambda$ represents a wavelength of a light wave, and hi represents a thickness of each of the sub-layers.

According to an embodiment of the present invention, when the incident light is into the i-th layer, the complex amplitude matrix corresponding to the incident light in the global coordinate system is calculated, and the complex amplitude matrix is expressed as:

$$
\begin{bmatrix} \tilde{E}_{in,x} \\ \tilde{E}_{in,y} \end{bmatrix} = \begin{bmatrix} A_{in,x}e^{-i\varphi_{in,x}} \\ A_{in,y}e^{-i\varphi_{in,y}} \end{bmatrix},
$$

wherein A represents an amplitude of the light wave, φ represents a phase, and in represents the incident light.

According to an embodiment of the present invention, the method of calculating the intensity of light leakage further includes the following steps:

S100: rotating the complex amplitude matrix by an angle of θi to correspondingly obtain a local x'y' coordinate system, and obtaining the complex amplitude matrix corresponding to the incident light in the local x'y' coordinate system as follows:

$$
\begin{bmatrix} \tilde{E}_{out,x'} \\ \tilde{E}_{out,y'} \end{bmatrix} = \begin{bmatrix} \tilde{E}_{in,x'}e^{-i\delta_i} \\ \tilde{E}_{in,y'} \end{bmatrix},
$$

wherein x' and y' are coordinate values corresponding to the local x'y' coordinate system, and "out" represents the transmitted light; and S101: further rotating the complex amplitude matrix obtained in the local x'y' coordinate system by an angle of −θi after conversion is completed, and obtaining the complex amplitude matrix of the transmitted light corresponding to the incident light in the global XY coordinate system as follows:

$$
\begin{bmatrix} \tilde{E}_{out,x} \\ \tilde{E}_{out,y} \end{bmatrix} = G_i \cdot \begin{bmatrix} \tilde{E}_{in,x} \\ \tilde{E}_{in,y} \end{bmatrix},
$$

wherein $$
G_i = T_i^{-1} \cdot \begin{bmatrix} e^{-i\delta_i} & 0 \\ 0 & 1 \end{bmatrix} \cdot T_i.
$$

According to an embodiment of the present invention, the step S101 further includes the following steps:

multiplying complex amplitude corresponding to the incident light in the sub-layers when the transmitted light passes through an m-th layer of sub-layers;

wherein $$
\begin{bmatrix} \tilde{E}_{out,x} \\ \tilde{E}_{out,y} \end{bmatrix} = G_m \cdot \ldots \cdot G_2 \cdot G_1 \cdot \begin{bmatrix} \tilde{E}_{in,x} \\ \tilde{E}_{in,y} \end{bmatrix}.
$$

According to an embodiment of the present invention, the intensity of light leakage is equal to a square of a modulus of the complex amplitude matrix corresponding to a component on a y-axis of the complex amplitude matrix corresponding to the transmitted light.

In summary, beneficial effects of embodiments of the present invention are as follows:

An embodiment of the present invention provides a method of calculating an intensity of light leakage. By establishing a finite element model, bending deformation is applied to the finite element model, and the phase difference of the light is calculated and solved by the stress generated by the model under the bending deformation. The complex amplitude matrix of the curved display device and the intensity of light leakage of the display are finally obtained according to the resulting stress and conversion relationship. The calculation and determination method in an embodiment of the present invention is faster and the obtained intensity of light leakage value is more accurate, which can provide a better reference for the subsequent design of the curved display device.

BRIEF DESCRIPTION OF THE SEVERAL VIEWS OF THE DRAWINGS

FIG. 2 is a schematic flowchart of steps of calculating an intensity of light leakage according to an embodiment of the present invention.

DESCRIPTION OF SPECIFIC EMBODIMENTS OF THE INVENTION

The following description of the various embodiments is provided to illustrate the specific embodiments of the present invention with reference to the accompanying drawings.

With continuous development of display panel manufacturing technology, people pay more and more attention to curved display devices. The curved display devices can have larger viewing angles when displaying images and provide better experience. However, the curved display devices prepared in the prior art often have a certain degree of light leakage in a dark state, which in turn impacts performance of curved display devices. An embodiment of the present invention provides a method of calculating an intensity of light leakage of a curved display device to accurately calculate the intensity of light leakage of the curved display device during use, and then compensate the curved display device according to the obtained intensity of light leakage to improve various performances of the curved display device.

Figure 1:
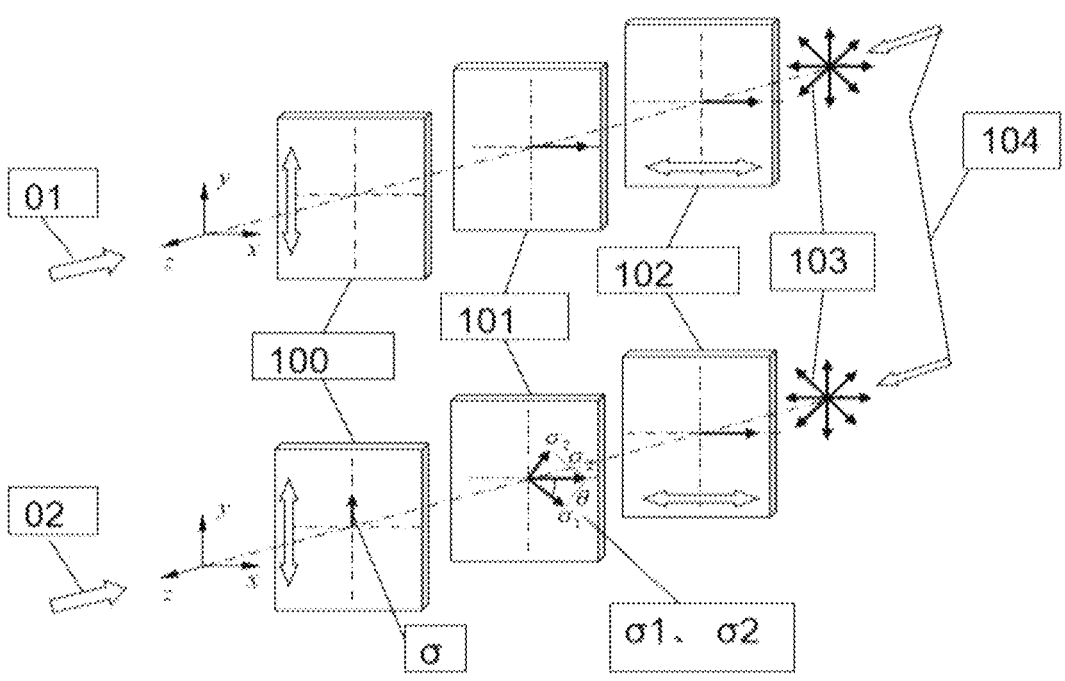
FIG. 1 is a schematic diagram of light leakage in a dark state of a curved display device provided in an embodiment of the present invention.

As shown in FIG. 1, FIG. 1 is a schematic diagram of light leakage in a dark state of a curved display device provided in an embodiment of the present invention. When calculating the intensity of light leakage of the display device, embodiments of the present invention take the intensity of light leakage of the display device as an example for illustration. Details can be referred to FIG. 1, wherein an incident light 104 is provided, and the incident light 104 is incident into the curved display device. In the curved display device, the incident light 104 will sequentially pass through various layers of the curved display device. At the same time, the incident light 104 will be polarized under an action of the layers when passing through the layers. For curved display products, glass in a panel has a certain curvature, and a certain degree of light leakage will occur when transmitted light passes through a curved surface. The incident light 104 in an embodiment of the present invention may be light emitted by a backlight film layer inside the display.

The curved display device includes multiple film layers, preferably, such as a horizontal polarizer 102, a glass layer 101, and a vertical polarizer 100. Specific positional relationship of above-mentioned film layers is not specifically limited. When the incident light 104 does not pass through any film layer, a vibration direction of the incident light is an arbitrary direction, such as a vibration direction 103 of the incident light. The vibration direction 103 of incident light can vibrate in all directions.

Specifically, in an embodiment of the present invention, a center of each film layer is taken as a coordinate origin O. For example, a center of a screen of the vertical polarizer 100 is taken as the origin. Meanwhile, a horizontal direction is taken as an X coordinate axis, a vertical direction is taken as a Y coordinate axis, and a direction from a backlight side to outside of the curved display device is defined as a positive direction of a Z coordinate axis. After a spatial coordinate system is defined, the incident light 104 generated by the backlight propagates along the positive direction of the z-axis and passes through the horizontal polarizer 102, the glass layer 101, and the vertical polarizer 100 of the curved display device in sequence.

As a user, the curved display device can be observed from a first observation direction 01 or a second observation direction 02, wherein the observation direction is along a negative direction of the z-axis. Since light is a wave and has a certain amount of energy, it vibrates in a direction vertical to a propagation direction. At the same time, since the incident light 104 generated by a backlight module is white light, it has vibration components in an arbitrary direction in an XY plane. In an embodiment of the present invention, the glass layer 101 does not impact the vibration direction of the light, that is, when the incident light 104 passes through the glass layer 101, a corresponding phase difference will not be generated inside the glass layer 101. Obviously, after the incident light transits a combination of the horizontal polarizer and the vertical polarizer, no light will pass through, which will cause a dark state of the screen.

In a normal condition, a certain amount of stress may be present inside the glass layer 101. Under an action of a stress, the glass layer 101 will bend to a certain extent, so that when the incident light 104 passes through the glass layer 101, a photoelastic effect occurs. That is, the glass layer 101 has stress components in different directions on a surface of the glass layer 101. A direction of the stress component is different from a direction of a principal stress corresponding to the surface of the glass layer 101. In an embodiment of the present invention, stress components $\sigma 1$, $\sigma 2$ are obtained by decomposing horizontally polarized light and stress in the direction of the principal stress. The transmitted light after passing through the glass layer 101 will generate a light component that vibrates in a vertical direction Y, which will cause light leakage after passing through an optical axis of the vertical polarizer 100.

Figure 3:
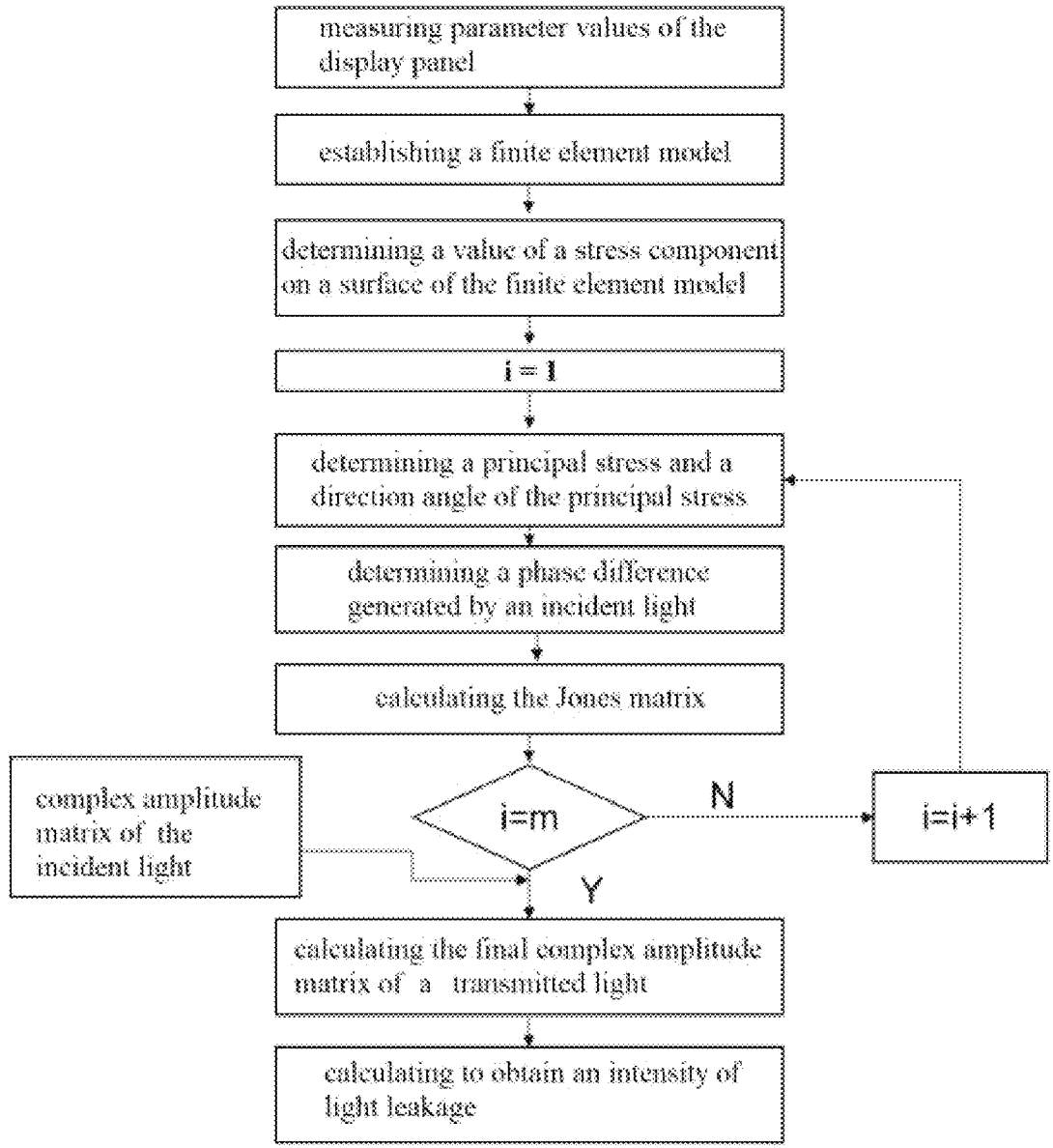
FIG. 3 is a flowchart of an algorithm corresponding to an intensity of light leakage calculation according to an embodiment of the present invention.

Therefore, according to the above-mentioned principle of light leakage, embodiments of the present invention are illustrated with reference to FIG. 2 and FIG. 3, wherein FIG. 2 is a schematic flowchart of steps of calculating an intensity of light leakage according to an embodiment of the present invention, and FIG. 3 is a flowchart of an algorithm corresponding to an intensity of light leakage calculation according to an embodiment of the present invention.

Specifically, the method of calculating the intensity of light leakage includes following steps:

S100: providing a display panel, and measuring various parameter values of the display panel;

S101: determining a global XY coordinate system, and establishing a finite element model on the global XY coordinate system according to the measured parameter values;

S102: dividing the finite element model into at least two sub-layers, applying a bending deformation force to the finite element model, and extracting a stress component value generated on a surface of one of the sub-layers corresponding to a side of the finite element model when the finite element model is deformed;

S103: calculating a principal stress value and a direction angle of the principal stress corresponding to the one of the sub-layers according to the stress component value on the surface of the one of the sub-layers;

S104: obtaining a phase difference generated by an incident light on each of the sub-layers according to the principal stress value of the one of the sub-layers, and obtaining a complex amplitude matrix of a transmitted light corresponding to the incident light according to the phase difference; and S105: repeating the above steps, and respectively measuring the complex amplitude matrix of the transmitted light when the incident light passes through each of the sub-layers, and obtaining an intensity of light leakage of the curved display device according to the complex amplitude matrix.

The intensity of light leakage of a curved display device is not easy to calculate because of a shape of a curved surface. Therefore, in the present invention, the provided display panel is measured first. Specifically, structural parameters such as a length, a width, a thickness, and a bending curvature of the curved display panel are measured and obtained. In an embodiment of the present invention, a thickness h of the glass layer 101 is taken as an example for description. In addition, based on the above parameters, a finite element model representing the stress of each layer of the curved display device is established in a simulation analysis software. Since a liquid crystal layer inside the curved display device is relatively thin, a thickness of the liquid crystal layer is negligible. In establishment of the model, the glass layer corresponding to an array substrate layer of the display panel and the glass layer corresponding to the color filter substrate layer are mainly used as a main model object to be established to simulate a structure of a real display panel. The finite element model established in an embodiment of the present invention can be established in different analysis software. Through the establishment of the model, an actual product can be reflected on the finite element model, and various forces on the finite element model can be analyzed to obtain a required intensity value of light leakage in an embodiment of the present invention.

When establishing the above-mentioned finite element model, first select a coordinate origin, and use the coordinate origin as the coordinate origin of the global XY coordinate system to establish the finite element model.

Figure 4A:
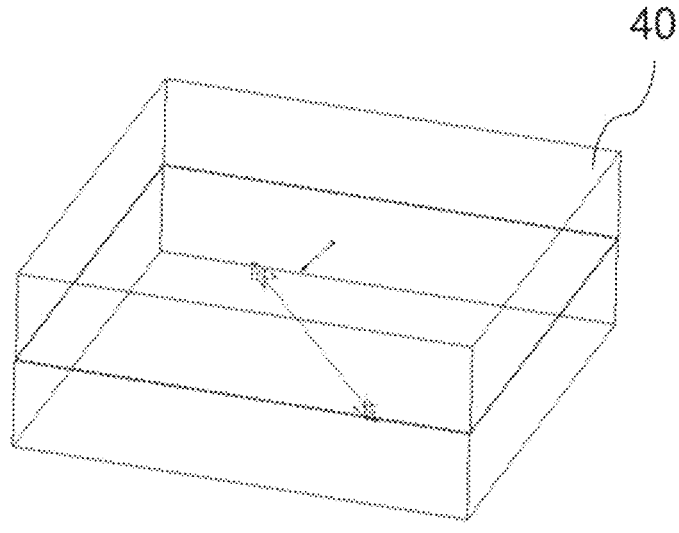
FIG. 4A is a schematic diagram of a finite element model provided by an embodiment of the present invention.

Specifically, when calculating the generated stress component value, the finite element mesh is divided. In an embodiment of the present invention, the glass layer 101 adopts a grid with a grid type of a continuous shell unit structure, and distribution of each grid node on the glass layer 101 is completely consistent, as shown in the finite element model 40 shown in FIG. 4A. The finite element model 40 corresponds to the glass layer in the display panel. Thus, the finite element model 40 can better simulate the structure of the curved display device.

Since there is a certain stress on each layer of the curved display device, it is necessary to apply a certain force to the model to make a corresponding stress value appear inside the model. Specifically, the force can be fulfilled by applying a bending deformation to the finite element model. The force applied to the model is same as the force generated on each layer of the actual product. Therefore, by analyzing the model, the model can truly reflect the stress and a strain state of the actual product when it is bent. Furthermore, the intensity of light leakage required in the present invention can be obtained.

Specifically, when calculating the finite element model 40, firstly, a standard atmospheric pressure is applied to an upper surface and a lower surface of the finite element model 40, and the finite element model 40 is bent and deformed by the atmospheric pressure. Specifically, the finite element model 40 is pressed against a curved rigid middle frame, and the layers are completely attached. After that, the pressure is removed. Since the attachment set in embodiments of the present invention is a non-separable contact attribute, the finite element model will not rebound, and a state of the curved display device in actual application can be obtained.

Figure 4B:
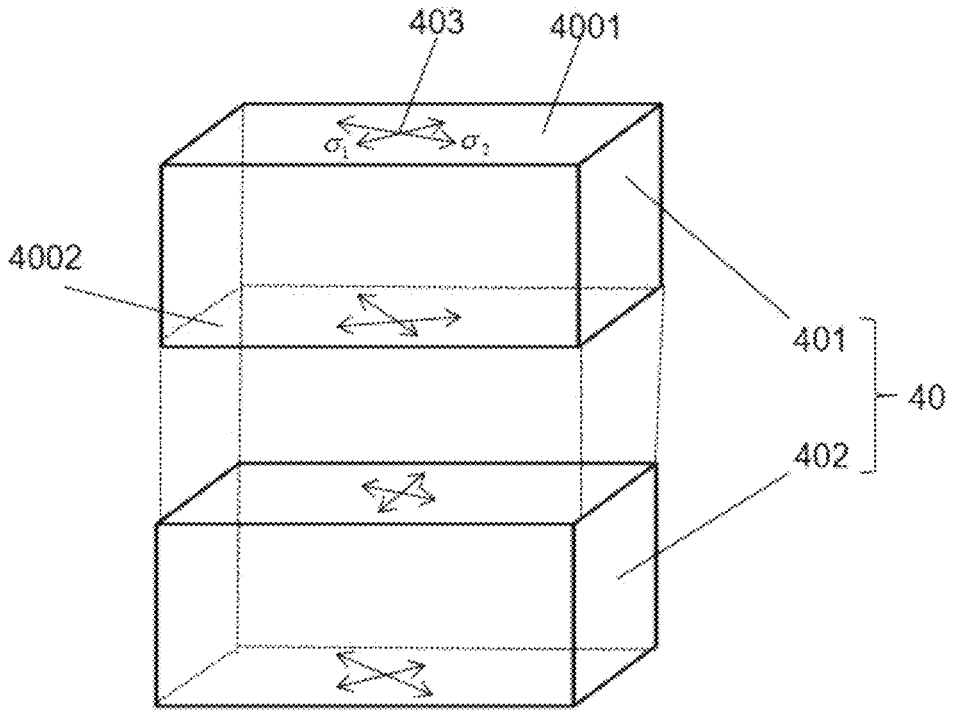
FIG. 4B is a schematic diagram of forces on each layer provided by an embodiment of the present invention.

Further, as shown in FIG. 4B, FIG. 4B is a schematic diagram of forces on each layer provided by an embodiment of the present invention. In the display panel, light emitted by the incident light in a module will pass through the multiple layers, such as the multi-layer glass film, and finally exits the display panel. The glass layer in an embodiment of the present invention is described by a first glass layer 401 and a second glass layer 402 as example. When an external force acts on the curved display panel, a layer on one side of the finite element model is an outermost layer of the finite element model. For example, an upper surface, for example, the upper surface 4001 (that is, a top surface) of the glass layer 401, or a lower surface of each of the glass layers will be deformed. Under an action of a bending force on the upper surface 4001 of the first glass layer 401, a first stress component $\sigma_1$ and a second stress component $\sigma_2$ appear at corresponding positions in direction 403 of the X axis and the Y axis.

At the same time, the lower surface 4002 (i.e. a bot surface) of the first glass layer 401 will also generate the first stress component and the second stress component under the action of the bending force, and a magnitude and a direction of the first stress component and the second stress component are related to a magnitude and a direction of the force received by the glass layer, and the magnitude and directions of the stresses on the glass layers in FIG. 4B are only exemplary.

Through the finite element model and an effect of the stress on each glass layer, the bending and the stress of each layer can be truly reflected. After passing through the curved layers, the incident light will have a certain angle with the direction of the principal stress of the layer surface, and light leakage will occur. For example, a normal stress component and a shear stress component of the incident light corresponding to the upper surface of each of the glass layers 101: $\sigma_{(top)x}$, $\sigma_{(top)y}$, $\tau_{(top)xy}$, and a normal stress component and a shear stress component of the incident light corresponding to the lower surface: $\sigma_{(bot)x}$, $\sigma_{(bot)y}$, $\tau_{(bot)xy}$ are first calculated; where "top" represents the upper surface of each of the film layers, and "bot" represents the lower surface of each of the film layers, as shown in Formula 1.

$$\begin{cases} \sigma_{(top)x}, \sigma_{(top)y}, \tau_{(top)xy} \\ \sigma_{(bot)x}, \sigma_{(bot)y}, \tau_{(bot)xy} \end{cases} \tag{1}$$

Meanwhile, since the glass layer 101 is relatively thick, the glass layer 101 can be divided into m layers in its thickness direction.

As such, the entire glass layer 101 is divided into a plurality of thin glass layers, and each of the thin glass layers so divided is a sub-layer, and sub-layers are stacked on each other to form the entire glass layer 101. That is, the divided multiple thin glass layers are stacked on each other to form the glass layer 101 in the embodiment of the present invention. Correspondingly, each of the thin glass layers will be bent to a certain extent under the action of stress. Since each of the thin glass layers is bent to a certain extent, a corresponding stress component will correspondingly appear on each of the thin glass layers. In an embodiment of the present invention, three stress component values are taken as an example for description. When the incident light passes through, it can be regarded as passing through each of the layers in turn, and finally transit the glass layer 101. On each of the thin glass layers, the incident light will form a certain angle with the direction of the principal stress of the thin glass layer. That is, when m is large enough and light passes through each of the thin glass layers, a stress change of each of the thin glass layers will not be obvious. In an embodiment of the present invention, in order to obtain more accurate various data, m can be selected from a range between 500 and 1000. Thus, according to a linear interpolation method, values of three stress components corresponding to an i-th layer of the thin glass layers are obtained, as shown in Formula 2:

$$\begin{cases} \sigma_{(i)x} = \dfrac{i-1}{m}(\sigma_{(top)x} - \sigma_{(bot)x}) + \sigma_{(bot)x} \\ \sigma_{(i)y} = \dfrac{i-1}{m}(\sigma_{(top)y} - \sigma_{(bot)y}) + \sigma_{(bot)y} \\ \tau_{(i)xy} = \dfrac{i-1}{m}(\tau_{(top)xy} - \tau_{(bot)xy}) + \tau_{(bot)xy} \end{cases} \tag{2}$$

After obtaining the stress component value corresponding to the surface of each of the thin glass layers, the magnitude of the principal stress and the direction of the principal stress on the glass layer 101 are calculated using the above values of the three stress components, as shown in Formula 3:

$$\left.\begin{array}{c} \sigma_{(i)1} \\ \sigma_{(i)2} \end{array}\right\} = \frac{\sigma_{(i)x} + \sigma_{(i)y}}{2} \pm \sqrt{\left(\frac{\sigma_{(i)x} - \sigma_{(i)y}}{2}\right)^2 + \tau_{(i)xy}^2} \tag{3}$$

$$\theta_i = \arctan\left(\frac{\tau_{(i)xy}}{\sigma_{(i)1} - \sigma_{(i)y}}\right)$$

In Formula 3, $\sigma_{(i)1}$ and $\sigma_{(i)2}$ respectively represent a first principal stress and a second principal stress of the layer in the XY plane, that is, a maximum principal stress and a minimum principal stress in the XY plane.

After obtaining the above-mentioned maximum principal stress and minimum principal stress, a local coordinate system x'y' is established by taking the directions of $\sigma_{(i)1}$ and $\sigma_{(i)2}$ as coordinate axis directions.

Further, when the incident light passes through the i-th layer, the complex amplitude matrix corresponding the incident light in the global XY coordinate system is as shown in Formula 4:

$$\begin{bmatrix} \tilde{E}_{in,x} \\ \tilde{E}_{in,y} \end{bmatrix} = \begin{bmatrix} A_{in,x}e^{-i\varphi_{in,x}} \\ A_{in,y}e^{-i\varphi_{in,y}} \end{bmatrix}; \tag{4}$$

wherein A represents an amplitude of a light wave, φ represents a phase, and in represents the incident light.

After obtaining the above complex amplitude matrix, the complex amplitude matrix in Formula (4) is decomposed into a local coordinate system x'y' where the direction of the principal stress of the i-th layer of the glass layers is located. An included angle between the two coordinates is θi, and:

$$\begin{bmatrix} \tilde{E}_{out,x'} \\ \tilde{E}_{out,y'} \end{bmatrix} = \begin{bmatrix} \tilde{E}_{in,x'}e^{-i\delta_i} \\ \tilde{E}_{in,y'} \end{bmatrix}; \tag{5}$$

wherein $T_i$ is a coordinate system rotation matrix, and $T_i$ is represented by the following Formula (6):

$$T_i = \begin{bmatrix} \cos\theta_i & \sin\theta_i \\ -\sin\theta_i & \cos\theta_i \end{bmatrix}. \tag{6}$$

A photoelastic effect appears on the glass layer due to incident light. Therefore, the transmitted light formed by the incident light in the glass layer will form a certain phase difference between the directions of the principal stresses of the glass layer, and the complex amplitude matrix corresponding to the transmitted light is as shown in Formula (7):

$$\begin{bmatrix} \tilde{E}_{out,x'} \\ \tilde{E}_{out,y'} \end{bmatrix} = \begin{bmatrix} \tilde{E}_{in,x'}e^{-i\delta_i} \\ \tilde{E}_{in,y'} \end{bmatrix}; \tag{7}$$

At the same time, according to the difference of the principal stresses and a theory of stress photoelasticity, it can be known that a phase difference produced when polarized light passes through the glass layer complies with Formula (8):

$$\delta_i = \frac{2\pi}{\lambda}[Ch_i(\sigma_{(i)1} - \sigma_{(i)2})]; \tag{8}$$

where C is a relative stress optical coefficient in each corresponding glass layer, λ is a wavelength of the light wave, and hi is the thickness of the layer.

Further, the complex amplitude matrix of the transmitted light corresponding to the above local coordinate system x'y' is converted to the global XY coordinate system again (that is, the local coordinate system is rotated by an angle of $-\theta_i$), and substituted into Formula (8) to obtain the following Formula (9):

$$\begin{bmatrix} \tilde{E}_{out,x} \\ \tilde{E}_{out,y} \end{bmatrix} = G_i \cdot \begin{bmatrix} \tilde{E}_{in,x} \\ \tilde{E}_{in,y} \end{bmatrix}; \tag{9}$$

wherein $G_i$ is the Jones matrix as follows:

$$G_i = T_i^{-1} \cdot \begin{bmatrix} e^{-i\delta_i} & 0 \\ 0 & 1 \end{bmatrix} \cdot T_i.$$

Further, if passing through m layers of the glass layers and considering an influence of the upper and the lower polarizers of each of the glass layers, the Jones matrices of the glass layers can be multiplied to obtain the Jones matrix of the system, and a final transmitted light can be obtained, as shown in Formula (10):

$$\begin{bmatrix} \tilde{E}_{out,x} \\ \tilde{E}_{out,y} \end{bmatrix} = G_m \cdot \ldots \cdot G_2 \cdot G_1 \cdot \begin{bmatrix} \tilde{E}_{in,x} \\ \tilde{E}_{in,y} \end{bmatrix}; \tag{10}$$

Further, due to a nature of the vertical polarizer, it can be known that the component of the transmitted light on the Y axis is the required light leakage, and a square of the complex amplitude matrix corresponding to this component is the intensity value of light leakage of the curved display device.

That is, the intensity value of light leakage of the curved display device is $I_{out}=|\tilde{E}_{out,y}|^2$.

Therefore, in an embodiment of the present invention, by establishing a finite element model and combining a stress relationship of light on each glass layer, the intensity value of light leakage $I_{out}$ of the curved display device is accurately obtained.

In an embodiment of the present invention, each glass layer is subdivided into multiple thin glass sub-layers during calculation. Therefore, after the calculation of each of the thin glass layers is completed, such as the calculation of an i-th glass layer, the above steps are repeated to calculate an (i+1)th thin glass layer until the calculation of the divided m thin glass layers is completed, and finally the complex amplitude matrix corresponding to the transmitted light in an embodiment of the present invention and the intensity value of light leakage of the curved display device are obtained.

Figure 5:
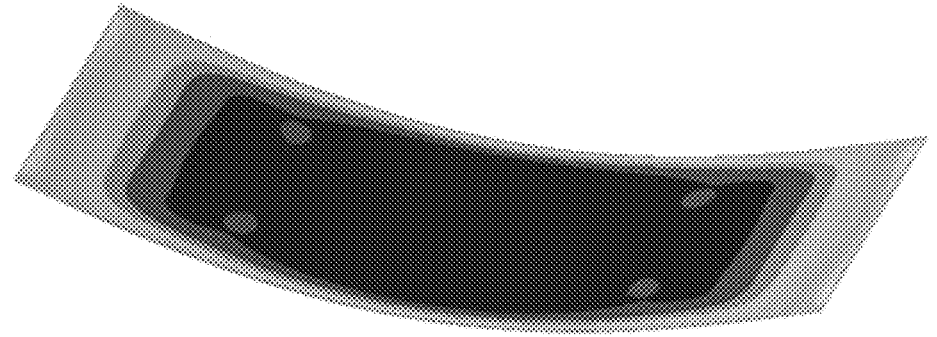
FIG. 5 is a schematic diagram of stress distribution of a finite element model established in an embodiment of the present invention.

As shown in FIG. 5, FIG. 5 is a schematic diagram of stress distribution of the finite element model established in an embodiment of the present invention. It is appreciated that a stress at a periphery of the screen is larger, and a stress at a middle of the screen is smaller due to a smaller degree of bending. Correspondingly, by combining the value of the intensity $I_{out}$ of light leakage obtained in the embodiments of the present invention, a size of a specific structure of the finite element model can be adjusted, and the curved display device can be compensated according to the intensity value of light leakage calculated in the embodiments of the present invention. A calculation process is simple and accurate, and meanwhile, so a problem of light leakage of the curved display device can be reduced according to a calculation result, and production cost of the curved display device is reduced while improving a display effect.

When calculating the intensity of light leakage of the display device, the calculation is not only limited to the above-mentioned curved display products, but can also be applied to other display products, such as other heterogeneous display products, which are calculated by the method of calculating the intensity of light leakage in the embodiments of the present invention, which can effectively compensate the intensity value of light leakage of the display device, thereby improving the display effect of the display device.

Further, an embodiment of the present invention also provides a calibration device, wherein the calibration device includes an analysis module and a calibration module, wherein the analysis module is used to establish a model and analyze the display panel. By analyzing the established model and transmitting the analysis result to the calibration module, the calibration module obtains the intensity value of light leakage of the display panel according to the analysis result, and compensates the display panel according to the intensity value of light leakage, thereby ensuring the display effect of the device.

The method of calculating the intensity of light leakage provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the scope of the technical solutions of the embodiments of the present application.

What is claimed is:

1. A method of calculating an intensity of light leakage, applied to a curved display panel comprising a glass layer, a horizontal polarizer and a vertical polarizer, and executed when a program is processed by a computer, the method including following steps:

measuring various parameter values of the display panel;

determining a global XY coordinate system and establishing a finite element model on the global XY coordinate system according to the measured parameter values, wherein the finite element model is corresponding to the glass layer;

dividing the finite element model into m sub-layers, wherein the m is in a range from 500 to 1000, applying a bending deformation force to the finite element model, and extracting a stress component value generated on a surface of one of the sub-layers corresponding to a side of the finite element model when the finite element model is deformed due to being completely attached to a curved rigid middle frame, wherein when the bending deformation force is applied to the finite element model, a magnitude of the bending deformation force is a standard atmospheric pressure, and the bending deformation force is applied to an upper surface and a lower surface of the finite element model;

calculating a principal stress value and a direction angle of a principal stress corresponding to the one of the sub-layers according to the stress component value on the surface of the one of the sub-layers, wherein the direction angle of the principal stress reflects a direction of a deformation of the glass layer;

calculating a phase difference generated by an incident light on each of the sub-layers due to photoelastic effect according to the principal stress value of the one of the sub-layers, wherein the phase difference is positively correlated with a curvature of the glass layer, and obtaining a complex amplitude matrix of a transmitted light corresponding to the incident light according to the phase difference; and repeating above steps, and respectively measuring the complex amplitude matrix of the transmitted light when the incident light passes through each of the sub-layers, and obtaining the intensity of light leakage of the curved display device according to the complex amplitude matrix.

2. The method of calculating the intensity of light leakage according to claim 1, wherein when calculating the stress component value, a normal stress component and a shear stress component of the incident light corresponding to the upper surface of each of the sub-layers: $\sigma_{(top)x}$, $\sigma_{(top)y}$, $\tau_{(top)x}$, and a normal stress component and a shear stress component of the incident light corresponding to the lower surface: $\sigma_{(bot)x}$, $\sigma_{(bot)y}$, $\tau_{(bot)xy}$ are first calculated; where "top" represents the upper surface of each of the sub-layers, and "bot" represents the lower surface of each of the sub-layers.

3. The method of calculating the intensity of light leakage according to claim 2, wherein when calculating the stress component value, the sub-layers are divided into m layers in a thickness direction, and a stress component value corresponding to an i-th layer of the m layers is obtained according to linear interpolation; wherein m and i are integers.

4. The method of calculating the intensity of light leakage according to claim 3, wherein a stress component value corresponding to the i-th layer is as follows:

$$
\begin{cases}
\sigma_{(i)x} = \dfrac{i-1}{m}(\sigma_{(top)x} - \sigma_{(bot)x}) + \sigma_{(bot)x} \\[2mm]
\sigma_{(i)y} = \dfrac{i-1}{m}(\sigma_{(top)y} - \sigma_{(bot)y}) + \sigma_{(bot)y} \;, \\[2mm]
\tau_{(i)xy} = \dfrac{i-1}{m}(\tau_{(top)xy} - \tau_{(bot)xy}) + \tau_{(bot)xy}
\end{cases}
$$

wherein $1 \leq i \leq m$.

5. The method of calculating the intensity of light leakage according to claim 1, wherein when calculating a magnitude of the principal stress value and the direction angle of the principal stress, a following formula is used:

$$
\left. \begin{array}{c} \sigma_{(i)1} \\ \sigma_{(i)2} \end{array} \right\} = \frac{\sigma_{(i)x} + \sigma_{(i)y}}{2} \pm \sqrt{\left(\frac{\sigma_{(i)x} - \sigma_{(i)y}}{2}\right)^2 + \tau_{(i)xy}^2}
$$

$$
\theta_i = \arctan\left(\frac{\tau_{(i)xy}}{\sigma_{(i)1} - \sigma_{(i)y}}\right),
$$

wherein $\sigma_{(i)1}$ and $\sigma_{(i)2}$ respectively represent a maximum principal stress and a minimum principal stress of a corresponding one of the sub-layers in the global xy coordinate plane, and $\theta i$ represents the direction angle of the principal stress.

6. The method of calculating the intensity of light leakage according to claim 1, wherein the phase difference is calculated according to a following relationship formula:

$$
\delta_i = \frac{2\pi}{\lambda}[Ch_i(\sigma_{(i)1} - \sigma_{(i)2})],
$$

wherein C represents a relative stress optical coefficient of each of the sub-layers, $\lambda$ represents a wavelength of a light wave, and hi represents a thickness of each of the sub-layers.

7. The method of calculating the intensity of light leakage according to claim 6, wherein when the incident light is incident into an i-th layer, the complex amplitude matrix corresponding to the incident light in the global coordinate system is calculated, and the complex amplitude matrix is expressed as:

$$
\begin{bmatrix} \tilde{E}_{in,x} \\ \tilde{E}_{in,y} \end{bmatrix} = \begin{bmatrix} A_{in,x} e^{-i\varphi_{in,x}} \\ A_{in,y} e^{-i\varphi_{in,y}} \end{bmatrix},
$$

wherein A represents an amplitude of the light wave, φ represents a phase, and in represents the incident light.

8. The method of calculating the intensity of light leakage according to claim 7, further comprising following steps:
rotating the complex amplitude matrix by an angle of θi to correspondingly obtain a local x'y' coordinate system, and obtaining the complex amplitude matrix corresponding to the incident light in the local x'y' coordinate system as follows:

$$
\begin{bmatrix} \tilde{E}_{out,x'} \\ \tilde{E}_{out,y'} \end{bmatrix} = \begin{bmatrix} \tilde{E}_{in,x'} e^{-i\delta_i} \\ \tilde{E}_{in,y'} \end{bmatrix},
$$

wherein x' and y' are coordinate values corresponding to the local x'y' coordinate system, and "out" represents the transmitted light; and
further rotating the complex amplitude matrix obtained in the local x'y' coordinate system by an angle of $-\theta i$ after a conversion is completed, and obtaining the complex amplitude matrix of the transmitted light corresponding to the incident light in the global XY coordinate system as follows:

$$
\begin{bmatrix} \tilde{E}_{out,x} \\ \tilde{E}_{out,y} \end{bmatrix} = G_i \cdot \begin{bmatrix} \tilde{E}_{in,x} \\ \tilde{E}_{in,y} \end{bmatrix},
$$

wherein wherein $G_i$ is a Jones matrix $$
G_i = T_i^{-1} \cdot \begin{bmatrix} e^{-i\delta_i} & 0 \\ 0 & 1 \end{bmatrix} \cdot T_i.
$$

wherein the obtaining of the complex amplitude matrix corresponding to the incident light in the local x'y' coordinate system comprises:
decomposing the complex amplitude matrix corresponding to the incident light in the global coordinate system into a local coordinate system x'y' where the direction of the principal stress of the i-th layer is located to obtain:

$$
\begin{bmatrix} \tilde{E}_{out,x'} \\ \tilde{E}_{out,y'} \end{bmatrix} = \begin{bmatrix} \tilde{E}_{in,x'} e^{-i\delta_i} \\ \tilde{E}_{in,y'} \end{bmatrix};
$$

wherein $T_i$ is a coordinate system rotation matrix, and $T_i$ is represented by:

$$
T_i = \begin{bmatrix} \cos\theta_i & \sin\theta_i \\ -\sin\theta_i & \cos\theta_i \end{bmatrix}
$$

9. The method of calculating the intensity of light leakage according to claim 8, wherein the rotating of the complex amplitude matrix obtained in the local x'y' coordinate system by an angle of $-\theta i$ conversion is completed, and obtaining of the complex amplitude matrix of the transmitted light corresponding to the incident light in the global XY coordinate system further comprises following steps:
multiplying complex amplitude matrices corresponding to the transmitted light in the sub-layers when the transmitted light passes through an m-th layer of sub-layers, to obtain a final transmitted light as follows:

$$
\begin{bmatrix} \tilde{E}_{out,x} \\ \tilde{E}_{out,y} \end{bmatrix} = G_m \cdot \ldots \cdot G_2 \cdot G_1 \cdot \begin{bmatrix} \tilde{E}_{in,x} \\ \tilde{E}_{in,y} \end{bmatrix}.
$$

10. The method of calculating the intensity of light leakage according to claim 1, wherein the intensity of light leakage is equal to a square of a modulus of a complex amplitude matrix corresponding to a component on a y-axis of the complex amplitude matrix corresponding to the transmitted light, which is represented as $$I_{out} = |\tilde{E}_{out,y}|^2.$$

11. A method of calculating an intensity of light leakage, applied to a curved display panel comprising a glass layer, a horizontal polarizer and a vertical polarizer, and executed when a program is processed by a computer, the method including following steps:

measuring parameter values of the display panel;

determining a global XY coordinate system, and establishing a finite element model on the global XY coordinate system according to the measured parameter values, wherein the finite element model is corresponding to the glass layer;

dividing the finite element model into m sub-layers, wherein the m is in a range from 500 to 1000, applying a bending deformation force to the finite element model, and extracting a stress component value generated on a surface of one of the sub-layers corresponding to a side of the finite element model when the finite element model is deformed due to being completely attached to a curved rigid middle frame;

calculating a principal stress and a direction angle of the principal stress corresponding to the one of the sub-layers according to the stress component value on the surface of the one of the sub-layers, wherein the direction angle of the principal stress reflects a direction of a deformation of the glass layer;

calculating a phase difference generated by an incident light on each of the sub-layers due to photoelastic effect according to the principal stress value of the one of the sub-layers, wherein the phase difference is positively correlated with a curvature of the glass layer, and obtaining a complex amplitude matrix of a transmitted light corresponding to the incident light according to the phase difference; and repeating the above steps, and respectively measuring the complex amplitude matrix of the transmitted light when the incident light passes through each of the sub-layers, and obtaining an intensity of light leakage of the curved display device according to the complex amplitude matrix.

12. The method of calculating the intensity of light leakage according to claim 11, wherein when calculating the stress component value, a normal stress component and a shear stress component of the incident light corresponding to the upper surface of each of the sub-layers: $\sigma_{(top)x}$, $\sigma_{(top)y}$, $\tau_{(top)xy}$, and a normal stress component and a shear stress component of the incident light corresponding to the lower surface: $\sigma_{(bot)x}$, $\sigma_{(bot)y}$, $\tau_{(bot)xy}$ are first calculated; where "top" represents the upper surface of each of the sub-layers, and "bot" represents the lower surface of each of the sub-layers.

13. The method of calculating the intensity of light leakage according to claim 12, wherein when calculating the stress component value, the sub-layers are divided into m layers in a thickness direction, and a stress component value corresponding to an i-th layer of the m layers is obtained according to linear interpolation; wherein m and i are integers.

14. The method of calculating the intensity of light leakage according to claim 13, wherein the stress component value corresponding to the i-th layer is as follows:

$$\begin{cases} \sigma_{(i)x} = \dfrac{i-1}{m}(\sigma_{(top)x} - \sigma_{(bot)x}) + \sigma_{(bot)x} \\ \sigma_{(i)y} = \dfrac{i-1}{m}(\sigma_{(top)y} - \sigma_{(bot)y}) + \sigma_{(bot)y} \\ \tau_{(i)xy} = \dfrac{i-1}{m}(\tau_{(top)xy} - \tau_{(bot)xy}) + \tau_{(bot)xy} \end{cases},$$

wherein $1 \leq i \leq m$.

15. The method of calculating the intensity of light leakage according to claim 11, wherein when calculating a magnitude of the principal stress and the direction angle of the principal stress, the following formula is used:

$$\left.\begin{matrix} \sigma_{(i)1} \\ \sigma_{(i)2} \end{matrix}\right\} = \frac{\sigma_{(i)x} + \sigma_{(i)y}}{2} \pm \sqrt{\left(\frac{\sigma_{(i)x} - \sigma_{(i)y}}{2}\right)^2 + \tau_{(i)xy}^2}$$

$$\theta_i = \arctan\left(\frac{\tau_{(i)xy}}{\sigma_{(i)1} - \sigma_{(i)y}}\right),$$

wherein $\sigma_{(i)1}$ and $\sigma_{(i)2}$ respectively represent a maximum principal stress and a minimum principal stress of a corresponding one of sub-layers in the global xy coordinate plane, and $\theta_i$ represents the direction angle of the principal stress.

16. The method of calculating the intensity of light leakage according to claim 11, wherein the phase difference is calculated according to the following relationship formula:

$$\delta_i = \frac{2\pi}{\lambda} [Ch_i(\sigma_{(i)1} - \sigma_{(i)2})],$$

wherein C represents a relative stress optical coefficient of each of the sub-layers, $\lambda$ represents a wavelength of a light wave, and hi represents a thickness of each of the sub-layers.

17. The method of calculating the intensity of light leakage according to claim 16, wherein when the incident light is into the i-th layer, the complex amplitude matrix corresponding to the incident light in the global coordinate system is calculated, and the complex amplitude matrix is expressed as:

$$\begin{bmatrix} \tilde{E}_{in,x} \\ \tilde{E}_{in,y} \end{bmatrix} = \begin{bmatrix} A_{in,x}e^{-i\varphi_{in,x}} \\ A_{in,y}e^{-i\varphi_{in,y}} \end{bmatrix},$$

wherein A represents an amplitude of the light wave, $\varphi$ represents a phase, and in represents the incident light.

18. The method of calculating the intensity of light leakage according to claim 17, further comprising the following steps:

rotating the complex amplitude matrix by an angle of $\theta_i$ to correspondingly obtain a local x'y' coordinate system, and obtaining the complex amplitude matrix corresponding to the incident light in the local x'y' coordinate system as follows:

$$\begin{bmatrix} \tilde{E}_{out,x'} \\ \tilde{E}_{out,y'} \end{bmatrix} = \begin{bmatrix} \tilde{E}_{in,x'} e^{-i\delta_i} \\ \tilde{E}_{in,y'} \end{bmatrix},$$

wherein x' and y' are coordinate values corresponding to the local x'y' coordinate system, and "out" represents the transmitted light; and further rotating the complex amplitude matrix obtained in the local x'y' coordinate system by an angle of $-\theta i$ after conversion is completed, and obtaining the complex amplitude matrix of the transmitted light corresponding to the incident light in the global XY coordinate system as follows:

$$\begin{bmatrix} \tilde{E}_{out,x} \\ \tilde{E}_{out,y} \end{bmatrix} = G_i \cdot \begin{bmatrix} \tilde{E}_{in,x} \\ \tilde{E}_{in,y} \end{bmatrix},$$

wherein $G_i$ is a Jones matrix:

$$G_i = T_i^{-1} \cdot \begin{bmatrix} e^{-i\delta_i} & 0 \\ 0 & 1 \end{bmatrix} \cdot T_i.$$

wherein the obtaining of the complex amplitude matrix corresponding to the incident light in the local x'y' coordinate system comprises:

decomposing the complex amplitude matrix corresponding to the incident light in the global coordinate system into a local coordinate system x'y' where the direction of the principal stress of the i-th layer is located to obtain:

$$\begin{bmatrix} \tilde{E}_{out,x'} \\ \tilde{E}_{out,y'} \end{bmatrix} = \begin{bmatrix} \tilde{E}_{in,x'} e^{-i\delta_i} \\ \tilde{E}_{in,y'} \end{bmatrix};$$

wherein $T_i$ is a coordinate system rotation matrix, and $T_i$ is represented by:

$$T_i = \begin{bmatrix} \cos\theta_i & \sin\theta_i \\ -\sin\theta_i & \cos\theta_i \end{bmatrix}$$

19. The method of calculating the intensity of light leakage according to claim 18, wherein the rotating of the complex amplitude matrix obtained in the local x'y' coordinate system by an angle of $-\theta i$ after a conversion is completed, and obtaining of the complex amplitude matrix of the transmitted light corresponding to the incident light in the global XY coordinate system further comprises the following steps:

multiplying complex amplitude matrices corresponding to the transmitted light in the sub-layers when the incident light passes through an m-th layer of sub-layers, to obtain a final transmitted light as follows:

$$\begin{bmatrix} \tilde{E}_{out,x} \\ \tilde{E}_{out,y} \end{bmatrix} = G_m \cdot \ldots \cdot G_2 \cdot G_1 \cdot \begin{bmatrix} \tilde{E}_{in,x} \\ \tilde{E}_{in,y} \end{bmatrix}.$$

20. The method of calculating the intensity of light leakage according to claim 11, wherein the intensity of light leakage is equal to a square of a modulus of the complex amplitude matrix corresponding to a component on a y-axis of the complex amplitude matrix corresponding to the transmitted light, which is represented as $$I_{out} = |\tilde{E}_{out,y}|^2.$$

* * * * *